United States Patent
Cruz et al.

(10) Patent No.: US 12,373,770 B2
(45) Date of Patent: Jul. 29, 2025

(54) RADIO FREQUENCY IDENTIFICATION (RFID) DRIVEN STOCKING PRIORITY DETERMINATION

(71) Applicant: Walmart Apollo, LLC, Bentonville, AR (US)

(72) Inventors: Jeffrey S. Cruz, Bentonville, AR (US); Sara Vaught, Centerton, AR (US); Ryan Sands Magnusson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 208 days.

(21) Appl. No.: 17/708,334

(22) Filed: Mar. 30, 2022

(65) Prior Publication Data

US 2022/0318733 A1 Oct. 6, 2022

Related U.S. Application Data

(60) Provisional application No. 63/168,651, filed on Mar. 31, 2021.

(51) Int. Cl.
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .......................... G06Q 10/087; G06K 7/10366
See application file for complete search history.

(56) References Cited

U.S. PATENT DOCUMENTS

| | | | |
|---|---|---|---|
| 6,272,394 B1 | 8/2001 | Lipps | |
| 8,321,302 B2 | 11/2012 | Bauer et al. | |
| 9,663,293 B2* | 5/2017 | Wurman | B65G 1/137 |
| 2004/0074974 A1* | 4/2004 | Senba | G06K 19/07728 |
| | | | 343/866 |
| 2005/0009122 A1* | 1/2005 | Whelan | B01L 3/545 |
| | | | 435/7.32 |
| 2005/0159982 A1* | 7/2005 | Showalter | G16H 10/40 |
| | | | 705/2 |
| 2007/0023512 A1 | 2/2007 | Miller et al. | |
| 2012/0283868 A1* | 11/2012 | Rutt | G06Q 10/083 |
| | | | 700/214 |

(Continued)

OTHER PUBLICATIONS

Singh, S. R., and Tarun Kumar. "Inventory optimization in efficient supply chain management." International Journal of Computer Applications in Engineering Sciences 1.4 (2011): 428-34. (Year: 2011).*

*Primary Examiner* — Nathan A Mitchell

(57) ABSTRACT

A system and method for radiofrequency identification (RFID) driven stocking priority determination. The method includes associating a first plurality of items with a first set of containers, analyzing first item data associated with the first plurality of items associated with the first set of containers and second item data for a second plurality of items associated with a second container, calculating a plurality of priorities for the first set of containers based on the analyzed first item data, the analyzed second item data, and a set of prioritization rules, assigning the plurality of priorities to the first set of containers, and transmitting the plurality of priorities to a user interface device.

20 Claims, 7 Drawing Sheets

(56) References Cited

U.S. PATENT DOCUMENTS

| | | | |
|---|---|---|---|
| 2014/0279660 A1* | 9/2014 | Santavicca | G06Q 10/083 |
| | | | 705/337 |
| 2016/0019493 A1* | 1/2016 | Santavicca | G06Q 10/0633 |
| | | | 705/7.15 |
| 2016/0203429 A1* | 7/2016 | Mellott | G06Q 10/06311 |
| | | | 705/7.25 |
| 2018/0150931 A1* | 5/2018 | Wagner | G06T 3/40 |
| 2018/0211208 A1* | 7/2018 | Winkle | H04L 12/2827 |
| 2019/0043004 A1* | 2/2019 | Lesieur | G02B 27/0176 |
| 2019/0139174 A1* | 5/2019 | Ward | G06Q 10/06316 |
| 2019/0164128 A1* | 5/2019 | Millhouse | H04L 67/12 |
| 2019/0236527 A1* | 8/2019 | Bhaumik | G06Q 10/087 |
| 2020/0210945 A1* | 7/2020 | Dejong | G06Q 10/087 |
| 2020/0273133 A1* | 8/2020 | Morris | G06Q 10/08 |
| 2022/0292455 A1* | 9/2022 | Rorro | G06Q 10/0833 |
| 2023/0259879 A1* | 8/2023 | Montgomery, III | |
| | | | G06Q 30/0633 |
| | | | 705/26.8 |
| 2024/0087469 A1* | 3/2024 | Taylor | G09B 9/003 |
| 2024/0193533 A1* | 6/2024 | Gustafsson | G06Q 10/0833 |

* cited by examiner

RADIO FREQUENCY IDENTIFICATION (RFID) DRIVEN STOCKING PRIORITY DETERMINATION

BACKGROUND

Retail stores are typically separated into a sales floor, where items for sale are displayed to consumers, and a storage location, where additional inventory is stored for replenishment when the items on the sales floor run low. Conventional methods of replenishing inventory of items for sale on the sales floor include a sales associate manually recognizing an item or items on the sales floor are in need of replenishment from the backroom storage, finding replacement items in the storage location, retrieving the items from the storage location, and placing the items from the storage location on the sales floor. However, manually recognizing the need for replenishment and finding the replacement items in the storage location is inefficient, time consuming, and subject to error.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Some examples provide a method for radiofrequency identification (RFID) driven stocking priority determination. The method includes associating a first plurality of items with a first set of containers, analyzing first item data associated with the first plurality of items associated with the first set of containers and second item data for a second plurality of items associated with a second container, wherein the first item data comprises data describing at least one attribute of at least one item in the first plurality of items, and wherein the second item data comprises data describing at least one attribute of at least one item in the second plurality of items, calculating a plurality of priorities for the first set of containers based on the analyzed first item data, the analyzed second item data, and a set of prioritization rules, the plurality of priorities indicating an order in which to transport each container of the first set of containers from a first location to a second location, assigning the plurality of priorities to the first set of containers, the plurality of priorities comprising a first priority of a first container of the first set of containers and a second priority of a second container of the first set of containers; and transmitting, via a network, the plurality of priorities to a user interface device, wherein each container of the first set of containers is transported from the first location to the second location in accordance with the plurality of priorities.

Other examples provide a system for radiofrequency identification (RFID) driven stocking priority determination. The system includes a memory and a processor. The processor is communicatively coupled to the memory and configured to associate a first plurality of items with a first set of containers, analyze first item data associated with the first plurality of items associated with the first set of containers and second item data for a second plurality of items associated with a second container, wherein the first item data comprises data describing at least one attribute of at least one item in the first plurality of items, and wherein the second item data comprises data describing at least one attribute of at least one item in the second plurality of items, calculate a plurality of priorities for the first set of containers based on the analyzed first item data, the analyzed second item data, and a set of prioritization rules, the plurality of priorities indicating an order in which to transport each container of the first set of containers from a first location to a second location, assign the plurality of priorities to the first set of containers, the plurality of priorities comprising a first priority of a first container of the first set of containers and a second priority of a second container of the first set of containers, and transmit, via a network, the plurality of priorities to a user interface device, wherein each container of the first set of containers is transported from the first location to the second location in accordance with the plurality of priorities.

Other examples provide one or more non-transitory computer storage media having computer-executable instructions for radiofrequency identification (RFID) driven stocking priority determination. The instructions, when executed by a processor, cause the processor to associate a first plurality of items with a first set of containers, analyze first item data associated with the first plurality of items associated with the first set of containers and second item data for a second plurality of items associated with a second container, wherein the first item data comprises data describing at least one attribute of at least one item in the first plurality of items, and wherein the second item data comprises data describing at least one attribute of at least one item in the second plurality of items, calculate a plurality of priorities for the first set of containers based on the analyzed first item data, the analyzed second item data, and a set of prioritization rules, the plurality of priorities indicating an order in which to transport each container of the first set of containers from a first location to a second location, assign the plurality of priorities to the first set of containers, the plurality of priorities comprising a first priority of a first container of the first set of containers and a second priority of a second container of the first set of containers, and transmit, via a network, the plurality of priorities to a user interface device, wherein each container of the first set of containers is transported from the first location to the second location in accordance with the plurality of priorities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
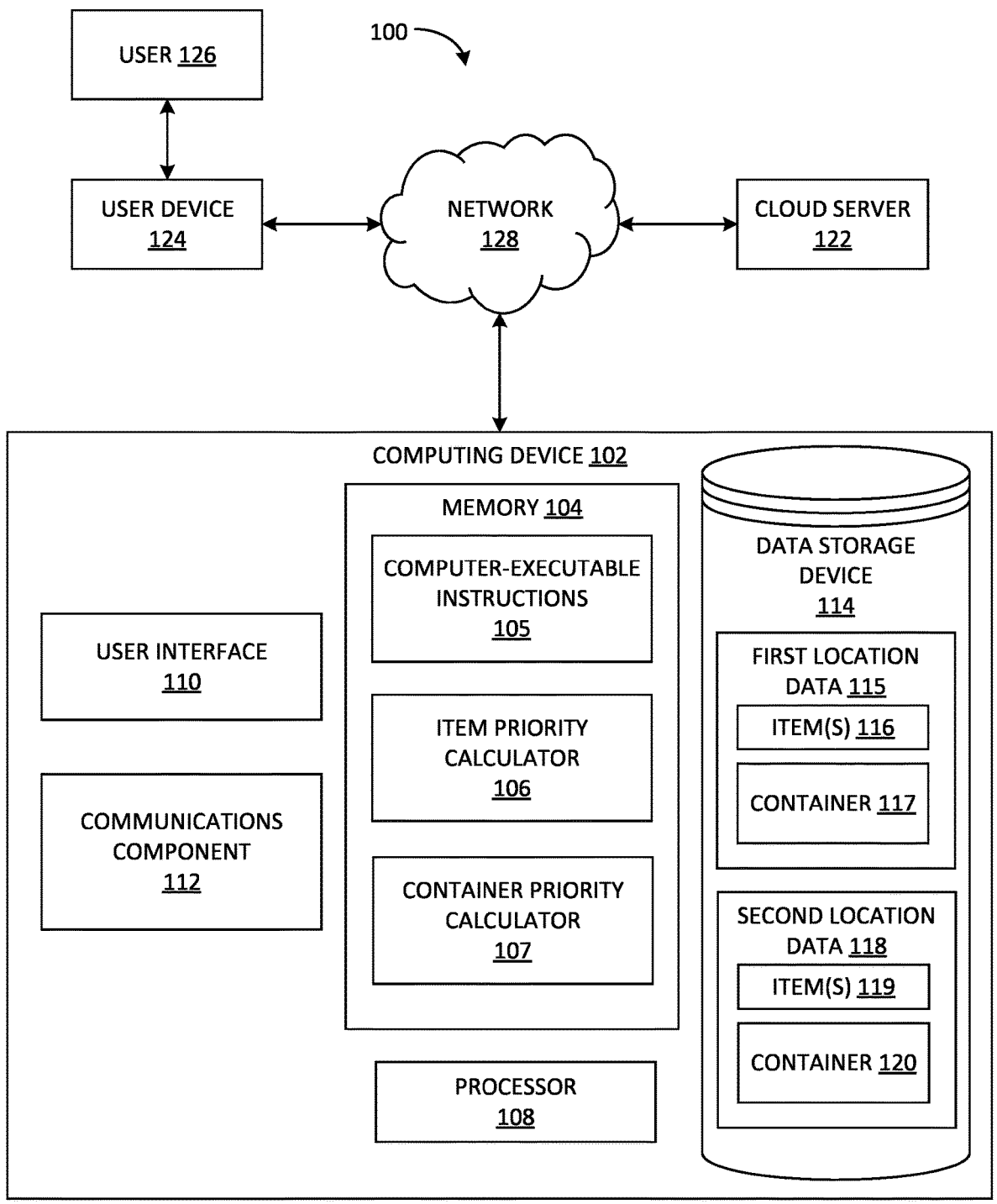
FIG. 1 is an exemplary a block diagram illustrating a system for determining priorities for removal of containers of items from a storage location.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

As discussed herein, current solutions for determining priorities to replenish items within an item display area, or other locations, include a human user manually recognizing an item in inventory is depleted or out-of-stock within the item display area of a brick-and-mortar retail facility, a picking area within a fulfillment center (FC), warehouse, distribution center (DC), as well as any other location in which items stores in a storage area are periodically transferred to containers or fixtures in another relatively more accessible area that is accesses by other users, such as customers or pickers.

Manually locating additional items in the storage location in response to a perceived item depletion, retrieving those items from the storage location, and placing the items from the storage location on the appropriate container within the item display area or other relevant space accessible to other users are cumbersome and error prone. Sales associates face several challenges in implementing these solutions because it is difficult to identify all of the inventory that requires restocking at any point in time and identify the appropriate inventory to use to restock in the backroom storage In many instances, the sales associate may be unaware of the location of particular inventory in the storage location due to constant flow of inventory from arrival, stocking in the storage location, and restocking on the sales floor. Additionally, the sales associate is sometimes unaware of which items or containers of items should be transferred from the storage location to the sales floor or other more user-accessible location due to a lack of current information associated with the items which is dynamic and can often change due to factors outside of the user's control.

Accordingly, various examples of the present disclosure provide an RFID driven stocking priority determination that provides several advantages over current solutions. The RFID driven stocking priority determination provided herein streamlines the priority determination and can be dynamically adapted due to changing conditions in the retail environment. Examples of the present disclosure provide systems and methods that include associating items with containers on the sales floor and on the storage location, scanning RFID tags on containers on the sales floor to track inventory on the sales floor, scanning RFID tags on containers in a storage location to track inventory in the storage location, accessing dynamic data corresponding to the environment, calculating and assigning priorities for the containers in the storage location based on item data, the dynamic data, and prioritization rules, and outputting the assigned priorities.

FIG. 1 an exemplary a block diagram illustrating a system for determining priorities for removal of containers of items from a storage location. The system 100 illustrated in FIG. 1 is for illustration only. Other examples of the system 100 can be used without departing from the scope of the present disclosure.

FIG. 1 illustrates a computing device 102 that represents any device executing computer-executable instructions 105 (e.g., as application programs, operating system functionality, or both) to implement the operations and functionality associated with the computing device 102. In some examples, the computing device 102 is a server, desktop personal computer, kiosk, or tabletop device. In some examples, the computing device 102 is a mobile computing device or any other portable device. A mobile computing device can include, for example but without limitation, a mobile telephone, laptop, tablet, computing pad, netbook, gaming device, and/or portable media player. In some examples, the computing device 102 represents a group of processing units or other computing devices.

In some examples, the computing device 102 includes a memory 104, at least one processor 108, user interface 110, communications component 112, and data storage device 114. The processor 108 includes any quantity of processing units and is programmed to execute computer-executable instructions 105 stored in the memory 104. The computer-executable instructions 105 are performed by the processor 108, performed by multiple processors 108 within the computing device 102, or performed by a processor external to the computing device 102.

The memory 104 includes any quantity of media associated with or accessible by the computing device 102. In some examples, the memory 104 is internal to the computing device 102, as shown in FIG. 1. In other examples, the memory 104 is external to the computing device or both external and internal. The memory 104 can include read-only memory and/or memory wired into an analog computing device. The memory 104 stores data, such as one or more applications. The applications, when executed by the processor 108, operate to perform functionality on the computing device 102. The applications can communicate with counterpart applications or services such as web services accessible via a network 128. In an example, the applications represent downloaded client-side applications that correspond to server-side services executing in a cloud. For example, the applications can include an item priority calculator 106 that calculates the priority of particular items as described in greater detail below. The applications further include a container priority calculator 107 that calculates the priority of particular containers as described in greater detail below.

In some examples, the user interface 110 includes a graphics card for displaying data to a user, such as the user 126, and receiving data from the user 126. The user interface 110 can also include computer-executable instructions, for example a driver, for operating the graphics card. The user interface 110 can further include a display, for example a touch screen display or natural user interface, and/or computer-executable instructions, for example a driver, for operating the display. The user interface 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 128 is implemented by one or more physical network components, such as, but without limitation, routers, switches, network interface cards (NICs), and other network devices. The network 128 is any type of network for enabling communications with remote computing devices, such as, but not limited to, a local area network (LAN), a subnet, a wide area network (WAN), a wireless (Wi-Fi) network, or any other type of network. In this example, the network 128 is a WAN, such as the Internet. However, in other examples, the network 128 is a local or private LAN.

In some examples, the system 100 includes a communications component 112. The communications component 112 includes a network interface card and/or computer-executable instructions, for example a driver, for operating the network interface card. Communication between the computing device 102 and other devices, such as but not limited to a user device 124 and/or a cloud server 122, can occur using any protocol or mechanism over any wired or wireless connection. In some examples, the communications component 112 is operable with short range communication technologies such as by using near-field communication (NFC) tags. In some examples, the communications component 112 includes a transceiver configured to transmit and receive signals, such as via the network 128.

The user device 124 represents any device executing computer-executable instructions. The user device 124 can be implemented as a mobile computing device, such as, but not limited to, a wearable computing device, a mobile telephone, laptop, tablet, computing pad, netbook, gaming device, and/or any other portable device. The user device 124 includes at least one processor and a memory. The user device 124 can also include a user interface component. In some examples, the user device 124 is an RFID module 185 and/or the user interface device 190 as described in greater detail in the description of FIG. 2 below.

The cloud server 122 is a logical server providing services to the computing device 102 or other clients, such as, but not limited to, the user device 124. The cloud server 122 is hosted and/or delivered via the network 128. In some non-limiting examples, the cloud server 122 is associated with one or more physical servers in one or more data centers. In other examples, the cloud server 122 is associated with a distributed network of servers.

The system 100 can optionally include a data storage device 114 for storing data, such as, but not limited to first location data 115 and second location data 118. The first location data 115 can include one or more items 116 stored in one or more containers 117. The first location data 115 can be a storage location 150, the one or more items 116 can be the inventory 211-216, and the one or more containers 117 can include the storage containers 160 described in greater detail in the description of FIGS. 2 and 3 below. The second location data 118 can include one or more items 119 stored in one or more containers 120. The second location data 118 can be an area within an item display area 129, such as, but not limited to, a portion of the item display area 129. An item display area is an area that is accessible to customer, such as, but not limited to, an area on a sales floor, including item displays. The one or more items 119 can be the inventory 201-206, and the one or more containers 120 can include the item display area containers 130 described in greater detail in the description of FIGS. 2 and 3 below.

The data storage device 114 can include one or more different types of data storage devices, such as, for example, one or more rotating disks drives, one or more solid state drives (SSDs), and/or any other type of data storage device. The data storage device 114, in some non-limiting examples, includes a redundant array of independent disks (RAID) array. In other examples, the data storage device 114 includes a database. The data storage device 114 in this example is included within the computing device 102, attached to the computing device, plugged into the computing device, or otherwise associated with the computing device 102. In other examples, the data storage device 114 includes a remote data storage accessed by the computing device via the network 128, such as a remote data storage device, a data storage in a remote data center, or a cloud storage.

Figure 2:
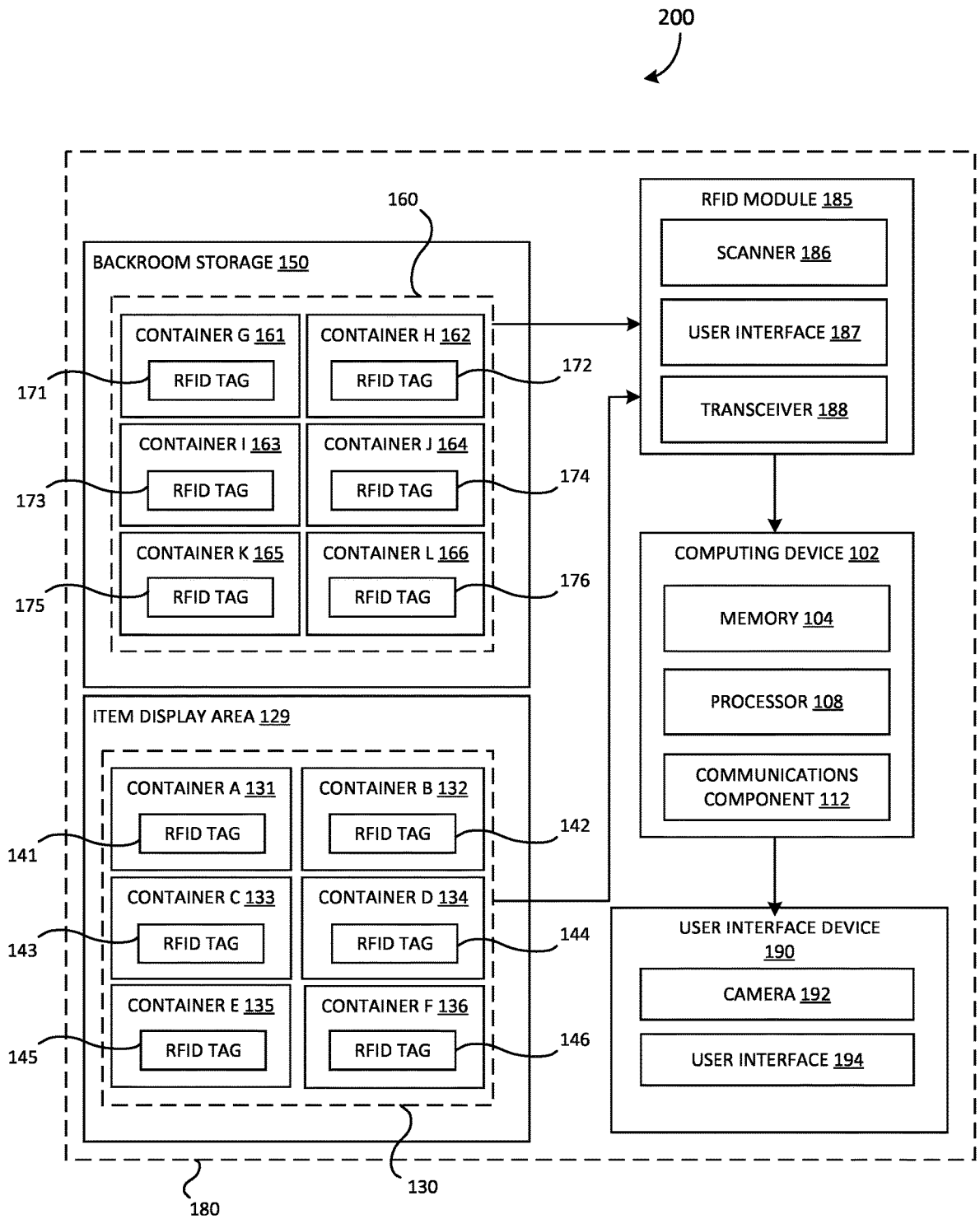
FIG. 2 is an exemplary block diagram illustrating a system for radiofrequency identification (RFID) driven stocking priority determination.

Referring now to FIG. 2, an exemplary block diagram illustrating a system for radiofrequency identification (RFID) driven stocking priority determination is shown. The system 200 illustrated in FIG. 2 is for illustrations only. Other examples of the system 200 can be used without departing from the scope of the present disclosure.

As shown in FIG. 2, the system 200 includes, without limitation, a computing device 102, an item display area 129, a storage location 150, and an RFID module 185. As described herein, the computing device 102 includes the memory 104, the processor 108, and the communications component 112. The memory 104 includes storage to store data and various programs. The programs include an operating system and one or more applications that are executed by the processor 108. In particular, the memory 104 can be computer storage media that includes volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

The processor 108 is configured to execute the operating system and the one or more applications stored in the memory 104. The applications include particular program code executed by the processor 108 that performs one or more of the functions described in greater detail below. The communications component 112 can be a transceiver that includes both transmit and receive components. The communications component is configured to send and receive signals to and from, respectively, the computing device 102. For example, the communications component 112 sends and receives signals to an external device, such as a user interface device 190, a server, or any other suitable electronic device.

The item display area 129, also referred to herein as the second location within a retail store, is an area available within the retail store for consumers to browse inventory for sale. The item display area 129 can include various departments, including, but not limited to, apparel, groceries, automotive, pharmacy, bed, bath, and toys. Some of the various departments can include sub-departments. For example, the apparel department can be further divided into men's apparel, women's apparel, and children's apparel, the grocery department can be further divided into frozen food, produce, meat, snacks, and drinks, and so forth.

As shown in FIG. 2, the item display area 129 includes containers 130. The containers 130 can be any device or container that maintains inventory and/or merchandise for sale. For example, the containers 130 can include, without limitation, clothes racks, shelves, cubbies, endcap displays, standalone displays, totes, boxes, pallets, carts, buggies, or any other container that holds inventory and displays the inventory for sale. As shown in FIG. 2, the containers 130 include container A 131, container B 132, container C 133, container D 134, container E 135, and container F 136, each of which can be any suitable container for containing and displaying inventory for sale. The item display area 129 is organized by location of the retail store. For example, each container 131-136 is assigned to a particular location on the item display area 129 for use in the system 200, as described in greater detail below. The location in the retail store corresponding to each container 131-136 is stored in the memory 104.

Each of the containers 131-136 includes a separate RFID tag. In particular, the container A 131 includes an RFID tag 141, the container B 132 includes an RFID tag 142, the container C 133 includes an RFID tag 143, the container D 134 includes an RFID tag 144, the container E 135 includes an RFID tag 145, and the container F 136 includes an RFID tag 146. Each RFID tag 141-146 corresponds to the respective container 131-136. Each RFID tag 141-146, when triggered by an RFID reader, such as the RFID module 185 described in greater detail below, transmits digital data to the RFID reader.

In some examples, scanning the digital data by an RFID tag reader allows the inventory to be tracked. For example, when an RFID tag reader, such as the RFID module 185, scans the digital data from the RFID tag 141, digital data of the inventory in the container A 131 is tracked accordingly. The RFID module 185 then transmits the digital data of the inventory in the container A 131 to the computing device 102, which receives the digital data via the communications component 112. Once the computing device 102 receives the digital data of the inventory in the containers 130, the computing device 102 determines the inventory that is low and in need of restocking, and the inventory that is not low and not in need of restocking.

The storage location 150, also referred to as a first location within the retail store, is an area within the retail store where inventory is stored but consumers conventionally do not browse inventory for sale. In some examples, the storage location 150 is a warehouse area of the retail store. The storage location 150 stores excess inventory for the departments stocked on the item display area 129. For example, excess inventory for apparel, groceries, automotive, pharmacy, bed, bath, and toys, among others, are stored in the storage location 150 prior to being placed on the item display area 129 to be selected by consumers for purchase. The storage location 150 includes storage containers 160. The storage containers 160 can be any device or container that maintains inventory and/or merchandise before the inventory and/or merchandise is transferred to the item display area 129. For example, the storage containers 160 can include racks, shelves, cubbies, or any other container that holds or displays inventory and/or merchandise before the inventory and/or merchandise is transferred to the item display area 129. As shown in FIG. 2, the storage containers 160 include container G 161, container H 162, container I 163, container J 164, container K 165, and container L 166, each of which can be any suitable container for containing inventory before the inventory is transferred to the item display area 129. The storage location 150 can be organized by location. For example, each container 161-166 is assigned to a particular location in the storage location 150 for use in the system 200, as described in greater detail below. The location in the storage location 150 corresponding to each container 161-166 is stored in the memory 104.

In some examples, the inventory stored in the storage container 160 corresponds to the inventory displayed for sale in the containers 130. The inventory displayed for sale can be specific, such as a particular item in a particular color in a particular size, or less specific, such as a particular item in several colors and/or several sizes. For example, container A 131 can display, on the item display area 129, women's shirts in size medium and color blue. Accordingly, container G 161 can store, in the storage location 150, additional inventory of the women's shirts in size medium and color blue that are displayed in the container A 131. In another example, the container A 131 includes women's shirts in all sizes in the color blue. Accordingly, container G 161 can store, in the storage location 150, additional inventory of the women's shirts in all sizes in the color blue that are displayed in the container A 131. In yet another example, the container A 131 includes women's shirts in all sizes in several colors. Accordingly, container G 161 can store, in the storage location 150, additional inventory of the women's shirts in all sizes in several colors that are displayed in the container A 131.

Each of the containers 161-166 includes a separate RFID tag. In particular, the container G 161 includes an RFID tag 171, the container H 162 includes an RFID tag 172, the container I 163 includes an RFID tag 173, the container J 164 includes an RFID tag 174, the container K 165 includes an RFID tag 175, and the container L 166 includes an RFID tag 176. Each RFID tag 171-176 corresponds to the respective container 161-166. Each RFID tag 171-176, when triggered by an RFID reader, such as the RFID module 185 described in greater detail below, transmits digital data to the RFID reader. Accordingly, scanning the digital data allows the inventory to be tracked. For example, when the RFID module 185 scans the digital data from the RFID tag 171, digital data of the inventory in the container H 162 is tracked accordingly. The RFID module 185 then transmits the digital data of the inventory in the container 161 to the computing device 102, which receives the digital data via the communications component 112. Once the computing device 102 receives the digital data of the inventory in the storage containers 160, the computing device 102 determines the inventory that can be utilized from the storage location 150 to restock the corresponding inventory on the item display area 129 that is low and in need of restocking.

The RFID module 185 is an RFID reader, or scanner, configured to scan the digital data of an RFID tag, such as any one of the RFID tags 141-146 and the RFID tags 171-176. In some examples, the RFID module 185 is a portable, handheld RFID reader such as a wand. In other examples, the RFID module 185 is a user equipment (UE) device or coupled to a UE device that includes an RFID reader. The RFID module 185 includes a scanner 186 configured to scan the digital data of an RFID tag, such as any one of the RFID tags 141-146 and the RFID tags 171-176. The RFID module 185 further includes a transceiver 188 configured to output the digital data scanned from the RFID tags 141-146 and the RFID tags 171-176 to the communications component 112 of the computing device 102.

The RFID module 185 further includes a user interface 187 configured to display results of the RFID scans of the RFID tags 141-146 and RFID tags 171-176 to a user. For example, the system 200 can have a threshold of data retrieved by the scanner 186 that indicates a percentage of data collected by the scanner 186. The user interface 187 is configured to provide feedback to the user based on the data collected by the scanner 186. In some examples, the user interface 187 displays the percentage of data collected. In some examples, the user interface 187 displays whether the threshold has been met. In some examples, the user interface 187 displays a map, or grid, of the item display area 129 indicating each of the item display area containers 130 to be scanned and/or a map, or grid, of the storage location 150 indicating each of the storage containers 160 to be scanned. Once the threshold has been met for a particular location, such as a particular container, the user interface 187 displays an indication the threshold for the location has been met. The indication can include a visual cue, such as a popup notification or a change of color of the location, and/or an audio cue, such as a particular sound.

For example, the user interface 187 can retrieve a grid or map that illustrates a separate icon, in a first color, at each of the item display area containers 130 at their particular location from the memory 104 of the computing device 102. The user interface 187 displays the map illustrating the locations of the container A 131, container B 132, container C 133, container D 134, container E 135, and container F 136. As the RFID module 185 moves throughout the item display area 129, such as by a sales associate of the retail store, the scanner 186 scans the RFID tags of the item display area containers 130 when the RFID module 185 is close enough to the particular RFID tag. For example, when the RFID module 185 is proximate to the container A 131, the scanner 186 scans the RFID tag 141. Based on the scan detecting a particular quantity of items present at the container A 131 that meets or exceeds the threshold, the user interface 187 can change the color of the icon to a second color for the particular location. Based on the scan detecting a particular quantity of items present at the container A 131 that does not meet or exceed the threshold, the user interface 187 can change the color of the icon to a third color for the particular location indicating an insufficient scan was performed or the quantity of items present is low. Accordingly, the display of the user interface 187 assists the user to measure the quality of the scan by the scanner 186. The data collected by the scanner 186 is transmitted, by the transceiver 188, to the computing device 102 for analysis.

Similarly, the user interface 187 can retrieve a grid or map that illustrates a separate icon, in a first color, at each of the storage containers 160 at their particular location from the memory 104 of the computing device 102. The user interface 187 displays the map illustrating the locations of the container G 161, container H 162, container I 163, container J 164, container K 165, and container L 166. As the RFID module 185 moves throughout the storage location 150, such as by a sales associate of the retail store, the scanner 186 scans the RFID tags of the storage containers 160 when the RFID module 185 is close enough to the particular RFID tag. For example, when the RFID module 185 is proximate to the container G 161, the scanner 186 scans the RFID tag 171. Based on the scan detecting a particular quantity of items present at the container G 161 that meets or exceeds the threshold, the user interface 187 can change the color of the icon to a second color for the particular location. Based on the scan detecting a particular quantity of items present at the container G 161 that does not meet or exceed the threshold, the user interface 187 can change the color of the icon to a third color for the particular location indicating an insufficient scan was performed or the quantity of items present is low. Accordingly, the display of the user interface 187 assists the user to measure the quality of the scan by the scanner 186. The data collected by the scanner 186 is transmitted, by the transceiver 188, to the computing device 102 for analysis.

As discussed herein, the computing device 102 receives the digital data from one or more of the RFID tags 141-146 and 171-176 scanned by the RFID module 185. The digital data includes a quantity of inventory at each of the item display area containers 130 and the storage containers 160 corresponding to each respective position of the retail store. For example, because the item display area containers 130 corresponds to the storage containers 160, when the digital data from both the item display area containers 130 and the storage containers 160 is received by the computing device 102, the processor 108 identifies an amount of each item available for sale on the item display area 129 and an amount of the item available in the storage location 150 available to be used to replenish the items available for sale on the item display area 129. In addition to the digital data received, the computing device 102 can also retrieve dynamic data corresponding to an environment 180 surrounding at least some aspects of the system 200. For example, the environment 180 can include the area surrounding the item display area 129, the storage location 150, the RFID module 185, and the user interface device 190. In some examples, the environment 180 further includes the computing device 102. In some examples, the computing device 102 is located outside of the environment 180 but is capable of retrieving dynamic data specific to the environment 180. The processor 108, based on the received item display area data, the received storage location data, and the retrieved dynamic data, can then determine a priority of the storage containers 160 to be transported to the item display area 129 to replenish the inventory of the item display area containers 130 on the item display area 129.

The dynamic data includes data about one or more of the surrounding area of the environment 180, local data, state data, or national data. In some examples, the dynamic data includes at least one of data regarding a particular sale that is ongoing at the time, daily data indicating a time of day, weekly data indicating a day of a week, calendar data indicating a time of year, news data indicating current events, weather data indicating weather surrounding the system, or sales data of inventory for sale. For example, daily data can indicate a particular time of day, such as morning, afternoon, or night, or a specific time, such as 11:00 AM. Calendar data can indicate a time of year, such as the current week, month, or season. News data can indicate current events in the local area, state, or country of the environment 180. For example, news data can include economic news, sports news, educational news, or political news. Weather data can include news regarding the current or future weather surrounding the environment 180. Sales data of the inventory for sale can include quantities of particular items for sale, quantities of particular items sold, the price of particular items for sale, and so forth. For example, the dynamic data can indicate that the day of the week is Friday, the time of day is afternoon, the month is April, news data include a local sports event, and the weather data indicates rain over the next twenty-four hours. Based on the retrieved dynamic data, the processor 108 can determine rain jackets with logos of the teams playing in the local sports event should be prioritized for the next 24 hours leading up to the event. The process of determining priorities will be discussed in greater detail below in the description of FIG. 4.

Once the priority of the storage containers to be transported to the item display area 129 is determined by the processor 108, the processor 108 controls the communications component 112 to output the determined priority. In some examples, the communications component 112 transmits the determined priority to the user interface device 190. The user interface device 190 can be an electronic device such as a mobile phone, a tablet, a laptop computer, a wearable device, or any other suitable electronic device capable of receiving the determined priority. In some examples, the user interface device 190 is the RFID module 185. In some examples, the user interface device 190 removably coupled to the RFID module 185. In some examples, the user interface device 190 is separate from the RFID module 185. In some examples, the user interface device 190 is an augmented reality (AR) capable device equipped with a camera 192 to capture visual data, such as an image or video, of the current location of the user interface device 190 and a user interface 194 to display the visual data overlaid with an indication of the container of the storage containers 160 determined to have the highest priority. The user interface device 190 is described in greater detail below in the description of FIG. 5.

In the example shown in FIG. 2, the system calculates priorities for transporting items from a storage location 150 to an item display area 129. The examples are not limited to prioritizing items in a backroom storage for removal to a portion of an item display area, such as, but not limited to, a portion of a sales floor associated with a retain environment. In other examples, the system calculates priorities for transferring items from a first area having limited accessibility to a second area having greater accessibility, such as, but not limited to, a picking area, a conveyor, a public area, a semi-public area, or any other secondary location granting customers or other associates access to the items in the second location.

Figure 3:
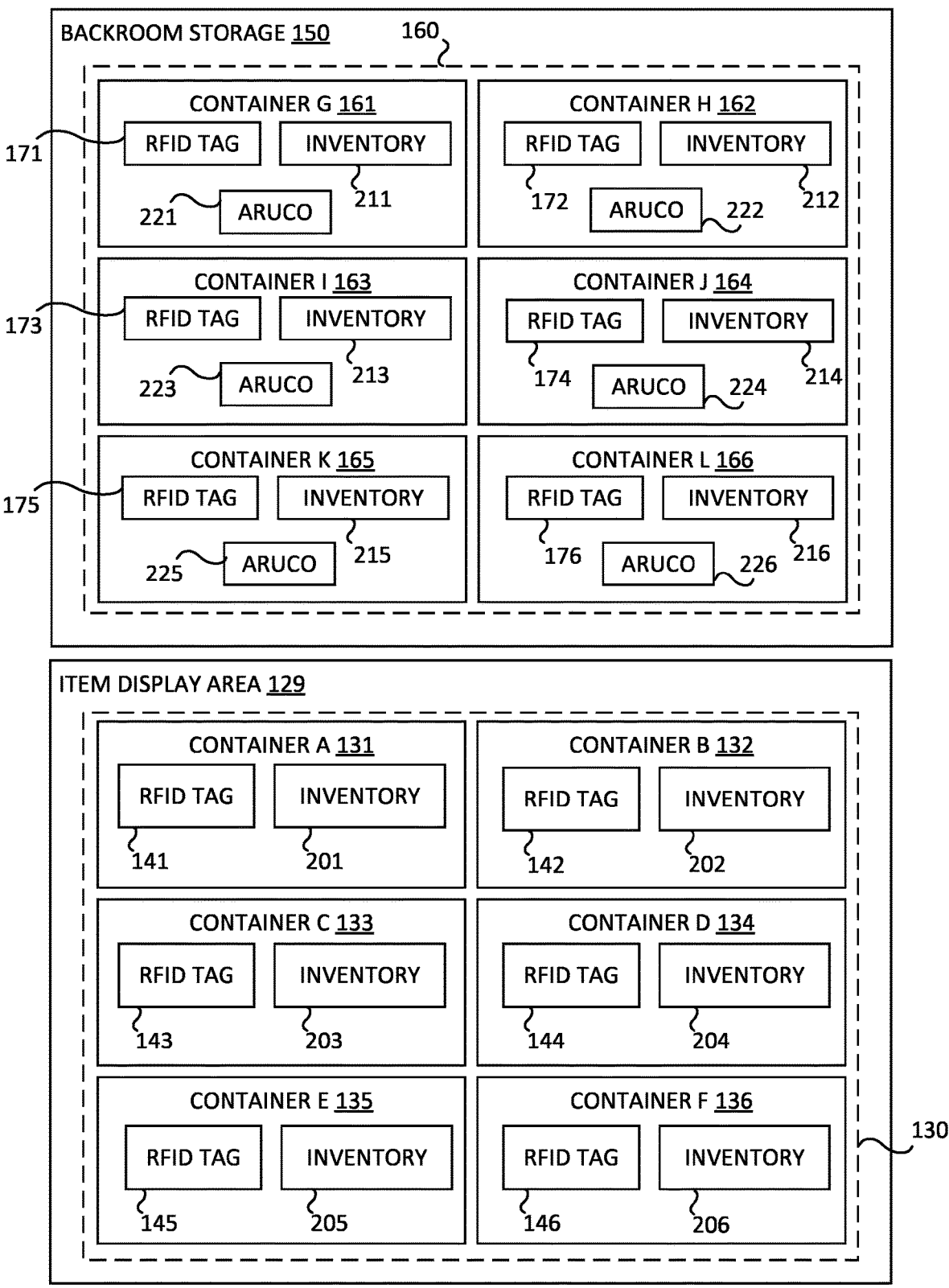
FIG. 3 is an exemplary block diagram illustrating an item display area and storage location.

FIG. 3 is an exemplary block diagram illustrating an item display area and storage location. More particularly, FIG. 3 illustrates the containers, and their respective contents, located on the item display area 129 and in the storage location 150 according to various examples of the present disclosure. The item display area 129 and the storage location 150 illustrated in FIG. 3 are for illustration only. Other examples of the item display area 129 and the storage location 150 can be used without departing from the scope of the present disclosure.

As shown in FIG. 3, the item display area 129 includes one or more containers, such as, but not limited to, the containers 130. Each container 131-136 of the item display area containers 130 includes an RFID tag and inventory. For example, the container A 131 includes an RFID tag 141 and inventory 201, the container B 132 includes an RFID tag 142 and inventory 202, the container C 133 includes an RFID tag 143 and inventory 203, the container D 134 includes an RFID tag 144 and inventory 204, the container E 135 includes an RFID tag 145 and inventory 205, and the container F 136 includes an RFID tag 146 and inventory 206. Each RFID tag 141-146 corresponds to the respective container 131-136 and includes digital data corresponding to the corresponding inventory 201-206 of the container. The inventory 201-206 includes the particular items for sale displayed in or on the respective container. In the example above, the container A 131 includes women's shirts in all sizes in several colors. The container A 131 can be a clothes rack displaying the inventory 201, which are the women's shirts. The container G 161, maintained in the storage location 150, corresponds to the container A 131 and includes additional inventory 211 of the women's shirts for replenishment of the inventory 201 on the item display area 129 when the inventory 201 is below an inventory threshold. In other words, the inventory 211 of the container G 161 is transferrable to the container A 131 and is therein referred to as the inventory 201. Similarly, the inventory 212 of the container H 162 is transferrable to the container B 132 and is therein referred to as the inventory 202, and so forth.

The inventory 211-216 is transported to the item display area 129 in an order specified by the determined priority by the processor 108, as described herein in greater detail below. In some examples, the inventory 211-216 is transferred to the item display area 129 by a sales associate. For example, the sales associate can transport the container itself, such as where the container G 161 is a rack containing the inventory 211, to the item display area 129 and transfer to the inventory 211 to the container A 131. In some examples, the sales associate transports the container to the item display area 129 using an additional vehicle, such as a cart, for easier transport. In some examples, the sales associate transports the inventory 211 to the item display area 129 without transporting the container G 161, such as where the container G 161 is a shelf fixed to a wall of the storage location 150.

As described herein, each of the storage containers 160, and its respective inventory, corresponds to a particular one of the item display area containers 130 and its respective inventory. For example, the container G 161 corresponds to the container A 131, the container H 162 corresponds to the container B 132, and so forth. Accordingly, the inventory 211 corresponds to the inventory 201, the inventory 212 corresponds to the inventory 202, and so forth. In order to increase efficiency in replenishing the inventory found in the item display area containers 130, in some examples the storage containers 160 are labeled with the particular location or the one of the item display area containers 130 the inventory corresponds to. In some examples, each container of the storage containers 160 includes an ArUco marker

221-226. For example, the container G 161 includes an ArUco marker 221, the container H 162 includes an ArUco marker 222, and so forth.

Each ArUco marker 221-226 is a synthetic marker that includes a matrix that can be scanned, for example by the scanner 186, and determine its identifier. For example, the scanner 186 of the RFID module 185 can scan the ArUco marker 221-226 and the user interface 187 displays the correct location of the inventory 201-206 corresponding to the inventory 211-216 of the scanned container. For example, the sales associate can utilize the RFID module 185 to scan the ArUco marker 225 on container K 165. The user interface 187 of the RFID module 185 can display a notification to the sales associate that the inventory 215 in the container K 165 corresponds to, and is used to replenish, the inventory 205 of the container E 135 on the item display area 129. The sales associate can then utilize the RFID module 185 to scan another ArUco marker, such as the ArUco marker 223 on the container I 163. The user interface 187 of the RFID module 185 can then display a notification to the sales associate that the inventory 213 in the container I 163 corresponds to, and is used to replenish, the inventory 203 of the container C 133 on the item display area 129. This process can then be completed for each container of the storage containers 160 until each ArUco marker 221-226 has been scanned by the RFID module 185. Following the scan of each RFID tag 141-146, RFID tag 171-176, and ArUco marker 221-226, the server receives the digital data of each scan and determines the priority of the storage containers 160 to be transported to the item display area 129.

Figure 4:
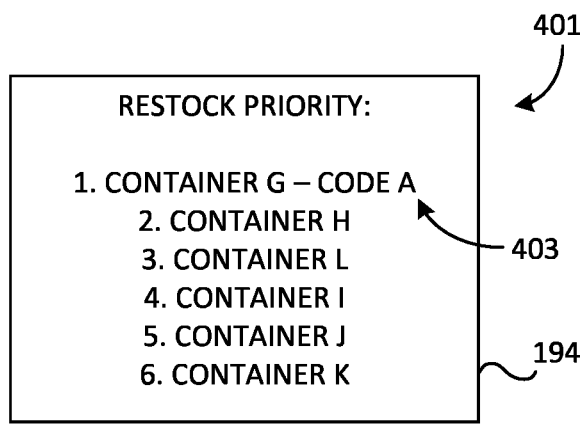
FIG. 4 is an exemplary block diagram illustrating a plurality of priorities.
Figure 4:
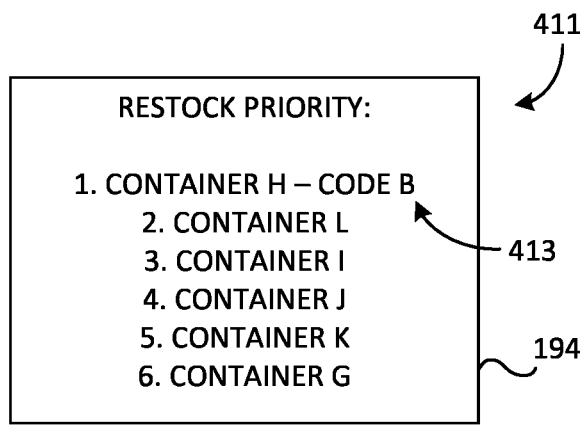
Figure 4:
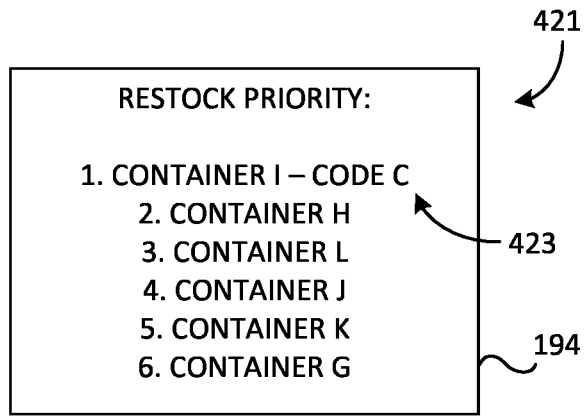

Turning now to FIG. 4, an exemplary block diagram illustrating a plurality of priorities is shown. The example restock priority listings shown in FIG. 4 are for illustration only. Other restock priority listings can be used without departing from the scope of the present disclosure.

FIG. 4 illustrates the user interface 194 showing various priority listings. The first priority listing 401 includes a first list of the containers 161-166 in the storage location 150 to be transported to their corresponding locations on the item display area 129 to replenish items for sale on the item display area 129 or add new items to the item display area (sales floor), which were previously unavailable within the item display area. As shown in the first priority listing 401, the first priority listing is container G 161 first, container H 162 second, container L 166 third, container I 163 fourth, container J 164 fifth, and container K 165 sixth. The first priority listing 401 is determined based on the received item display area data, the received storage location data, the retrieved dynamic data, and the set of prioritization rules, described in greater detail below. In the example described above, the retrieved dynamic data indicates the day of the week is Friday, the time of day is afternoon, the month is April, news data include a local sports event, and the weather data indicates rain over the next twenty-four hours. Based on the retrieved dynamic data, the processor 108 can determine rain jackets with logos of the teams playing in the local sports event should be prioritized for the next 24 hours leading up to the event. The received item data indicates the rain jackets with logos of the teams playing in the local sports event are part of the inventory 201 in container A 131. Because the rain jackets are predicted to be in high demand and the current supply on the item display area 129 is low, the inventory of container G 161 in the storage location is prioritized first for replenishment. The additional containers are prioritized in decreasing order taking into account the received item display area data, the received storage location data, and the retrieved dynamic data.

In some examples, the priority listing is dynamic. In other words, the priority listing changes over time based on inventory on the item display area 129 being replenished, the item display area data being updated, the storage location data being updated, and the retrieved dynamic data being updated. For example, the second priority listing 411 illustrates an updated priority listing following the inventory in the container A 131 being replenished from the container G 161. Accordingly, the second priority listing 411 includes the container G 161 being placed at the bottom of the restocking priority list. Due to the inventory 201 being replenished, replenishing the inventory 201 becomes the lowest priority for the system 200. Due to the container G 161 moving to the lowest priority slot, container H 162 becomes the highest priority container for replacement.

In some examples, the dynamic data can change, changing the priority of the inventory to be replenished on the item display area 129. For example, the processor 108 can retrieve new weather data indicating a change in the forecast from rain to sunshine. Because of the change in forecast, in the third priority listing 421 sunglasses become a higher priority, moving the inventory 213 of container I 163 to the highest priority position and moving container H 162 and container L 166 down out of the first and second priority positions, respectively. Priorities four through six are unchanged from the second priority listing 411 to the third priority listing 421 because priorities four through six were a lower priority than the container I 163 and are therefore unaffected by the dynamic prioritization of container I 163. Thus, a container having a first priority can be changed dynamically to a different second priority. The second priority can be lower than the first priority or higher than the first priority.

In some non-limiting examples, the restock priority listings include a reason code that identifies the reason for identifying a particular container as the highest priority. For example, the first priority listing 401 includes reason code A, identified as 403. In some examples, reason code A corresponds to the original calculated priority. Although illustrated as reason code A, any code can be used without departing from the scope of the present disclosure. In various examples, reason codes can be provided as letters, numbers, letters of the Greek alphabet, special characters such as "!, ?, @, #, $, %" and so forth, or a sequence of letters, numbers, letters of the Greek alphabet, and special characters. As shown in FIG. 4, the second priority listing 411 includes reason code B, identified as 413. In some examples, reason code B corresponds to a next highest priority of a container of the storage containers 160 after the container having the original priority reason code A has been replenished. The third priority listing 421 includes reason code C, identified as 423. In some examples, reason code C corresponds to a prioritized container that has been identified as a priority based on the reception of updated data. As described herein, the third priority listing 421 indicates container I 163 as the highest priority due to the processor 108 retrieving new weather data indicating the change in forecast from rain to sunshine, and the processor 108 in turn prioritizing sunglasses inventory 203 in container C 133, which corresponds to the inventory 213 stored in the container I 163 as the new highest priority.

When a particular container is indicated on the user interface 194 as a highest priority for restocking, such as the container G 161 identified as the highest priority in the first priority listing 401, the user interface 194 can utilize augmented reality (AR) to further assist a sales associate to identify the container G 161 indicated as the highest priority for restocking in the first priority listing 401.

Figure 5:
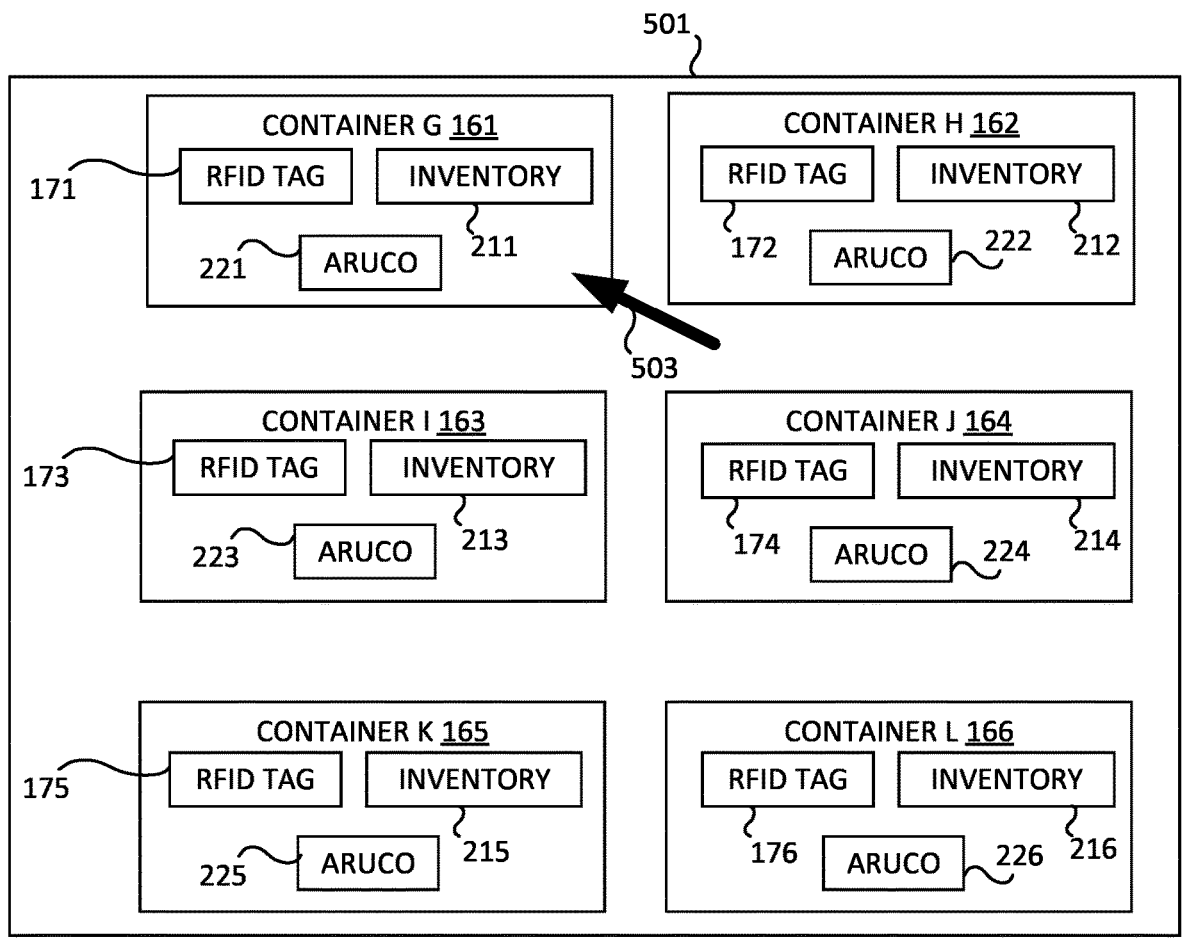
FIG. 5 is an exemplary block diagram illustrating an augmented reality (AR) view of the backroom storage location.

FIG. 5 is an exemplary block diagram illustrating an augmented reality (AR) view of the backroom storage location. The user interface display 501 implementing augmented reality illustrated in FIG. 5 is for illustration only. Other user interface displays implementing augmented reality can be used without departing from the scope of the present disclosure.

In some examples, the user interface display 501 is the user interface 196 of the user interface device 190. The user interface display 501 is a visualization of the storage location 150 and includes the container G 161, container H 162, container I 163, container J 164, container K 165, and container L 166 as described herein. Each container includes the corresponding RFID tag, inventory, and, in some examples, an ArUco marker as described herein. For example, the container G 161 includes the RFID tag 171, inventory 211, and ArUco marker 221, the container H 162 includes the RFID tag 172, inventory 212, and ArUco marker 222, and so forth. Accordingly, the user interface display 501 provides a sales associate with a digital image of the storage location 150 in order that augmented reality can be displayed on the user interface display 501.

The user interface display 501 is configured to provide an indicator 503 of the container having the highest priority as determined by the processor 108. The first priority listing 401 described in the description of FIG. 4 indicates the container G 161 as the highest priority of the storage containers 160 to be taken to the item display area 129. Accordingly, the indicator 503 illustrated in FIG. 5 indicates the container G 161 as the highest priority container. In some examples, the indicator 503 is a visual indicator, such as an arrow, a circle, a letter, a number, or any other suitable visual indicator. In some examples, the indicator is an audio indicator that alerts the sales associate to the correct container. In some examples, both an audio and visual indicator is provided. In examples where the second priority listing 411 is displayed on the user interface display 501, the indicator 503 indicates the container H 162. In examples where the third priority listing 421 is displayed on the user interface display 501, the indicator 503 indicates the container I 163.

In some examples, the indicator 503 indicates a particular inventory in a particular container. For example, in examples where the container G 161 is a clothes rack containing an inventory 211 of shirts arranged by color, the indicator 503 can be configured to indicate the particular inventory 211 in the container G 161 that is prioritized in the particular priority listing. In some examples, where the inventory 211 includes different types of inventory, such as shirts and pants, the indicator 503 can be configured to indicate the pants prioritized in the particular priority listing.

Figure 6:
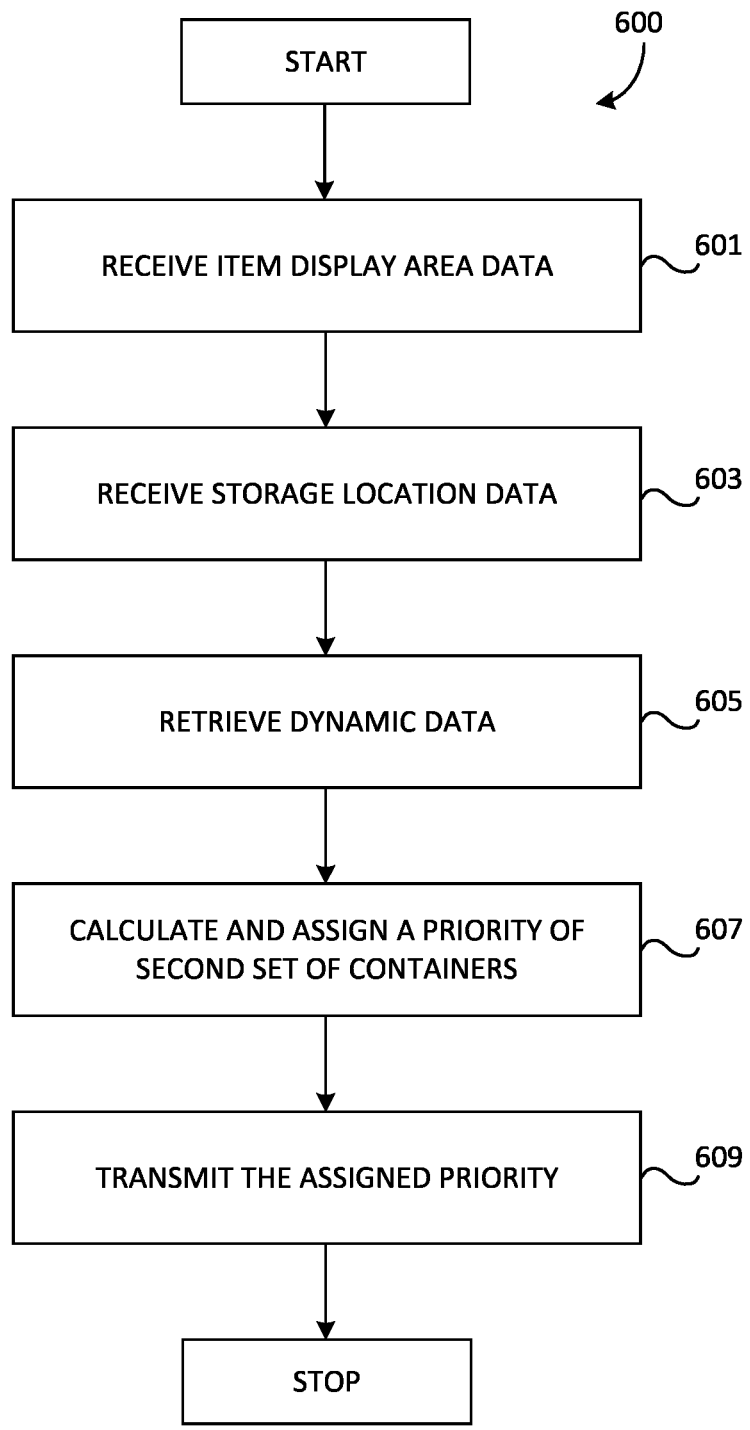
FIG. 6 is an exemplary flow chart illustrating operation of a computing device to calculate RFID driven stocking priority.

FIG. 6 is an exemplary flow chart illustrating operation of a computing device to calculate RFID driven stocking priority. The method 600 can be implemented by one or more elements of the system 100 and/or the system 200, such as the computing device 102 and RFID module 185. The method 600 is provided for illustration only. Other examples of the method 600 can be used without departing from the scope of the present disclosure.

The method 600 begins by receiving, by the computing device 102, item display area data at 601. The item display area data is obtained by scanning, by the RFID module 185, the respective RFID tag 141-146 of the containers of the item display area containers 130 to collect identification and quantities of inventory in stock of the inventory 201-206 contained displayed for sale on the item display area 129 in the item display area containers 130. The item display area data can refer to particular quantities of inventory 201-206 or determine the inventory relative to a particular threshold. For example, the item display area data can indicate the location of the container A 131 includes four medium blue women's shirts, four medium red women's shirts, and one medium white women's shirt. As another example, the item display area data can indicate the location of the container A 131 includes the four medium blue and four medium red women's shirts that meet a threshold for sufficient quantity at the location, but the one white women's shirts does not meet a threshold for sufficient quantity at the location.

The computing device 102 receives storage location data at 603. The storage location data is obtained by scanning, by the RFID module 185, the respective RFID tag 171-176 of the containers of the storage containers 160 to collect identification and quantities of the inventory 211-216 stored in the storage location 150 in the storage containers 160. The storage location data can refer to particular quantities of inventory 211-216 or determine the inventory relative to a particular threshold. For example, the storage location data can indicate the location of the container G 161 includes four medium blue women's shirts, four medium red women's shirts, and four medium white women's shirts. As another example, the storage location data can indicate the location of the container G 161 includes the four-medium blue, four medium red, and four medium white women's shirts meet a threshold for sufficient storage quantity at the location.

The computing device 102 retrieves dynamic data at 605. The dynamic data can be stored in the memory 104, in the data storage device 114, in the cloud server 122, or in another location accessible to the computing device 102 via the network 128 and retrieved, obtained, accessed, received, or acquire the dynamic data from its storage location. As described herein, the dynamic data can include one or more of data regarding a particular sale that is ongoing at the time, daily data indicating a time of day, weekly data indicating a day of a week, calendar data indicating a time of year, news data indicating current events, weather data indicating weather surrounding the system, or sales data of inventory for sale. In the example described in reference to FIG. 4 above, the retrieved dynamic data indicates the day of the week is Friday, the time of day is afternoon, the month is April, news data include a local sports event, and the weather data indicates rain over the next twenty-four hours. However, various examples are possible.

Although described in sequence in the method 600, various examples are possible without departing from the scope of the present disclosure. In some examples, item display area data for each of the item display area containers 130 is collected before collecting any of the storage location data for each of the storage containers 160. In some examples, item display area data for the container A 131 is collected and then storage location data for the corresponding container G 161 is collected prior to item display area data for the container B 132 being collected. In addition, operation 605, whereby the dynamic data is retrieved, can be performed before, during, or after each of operations 601 and 603. In other words, the dynamic data can be retrieved prior to either or both of the item display area data or storage location item data is being collected, while either or both of the item display area data or storage location data is being collected, or after either or both of the item display area data or storage location data is being collected without departing from the scope of the present disclosure.

The computing device 102 calculates a priority order of containers of the storage containers 160 to be taken to corresponding locations on the item display area 129 to replenish the inventory 201-206 in the item display area containers 130 at 607. The computing device 102 calculates, based on the received item display area data, the received storage location data, and the retrieved dynamic data, a priority for the items on the item display area 129 to be replenished or restocked. Because the locations of each container of the item display area containers 130 and the storage containers 160 are known, the computing device 102 identifies the container of the item display area containers 130 where the item having the highest priority is displayed for sale on the item display area 129, identifies the corresponding container of the storage containers 160 that stores additional stock of the item having the highest priority, and assigns that container of the storage containers 160 with the highest priority for replenishing. The computing device 102 then can identify the container of the item display area containers 130 where the item having the second highest priority is displayed for sale on the item display area 129, identifies the corresponding container of the storage containers 160 that stores additional stock of the item having the second highest priority, and assigns that container of the storage containers 160 with the second highest priority for replenishing, and so forth until a full priority listing is created or generated. For example, the priority listing can be any of the priority listings 401, 411, or 421 illustrated in FIG. 4.

In various examples, the priority listing can be updated based on receiving updated data. For example, updated item display area data and/or updated storage location data received from additional scans by the RFID module or updated dynamic data retrieved from the storage location can cause the computing device 102 to update the priority listings as described in the description of FIG. 4.

The computing device 102 outputs the assigned priority at 609. In some examples, the computing device 102 transmits the assigned priority to a device, such as the user interface device 190 illustrated in FIG. 2, which is utilized by a sales associate. In some examples, the computing device 102 displays the assigned priority on the user interface 110 where it can be read by a sales associate. Based on the outputted assigned priority, the inventory stored in the storage containers 160 that is assigned the highest priority can be removed from the storage location 150, transported to the corresponding location on the item display area 129, and transitioned from the container of the storage containers 160 to the corresponding container of the item display area containers 130.

After the first items are replenished by items previously stored in the storage containers 160, the priority listing is updated to reflect the changes. For example, once the item having the highest priority is replenished, that item is likely no longer a priority for replenishing. As shown in the priority listing 411 described in the description of FIG. 4, the item previously having the highest priority is moved to the lowest priority and the item previously having the second highest priority is moved to the highest priority.

Figure 7:
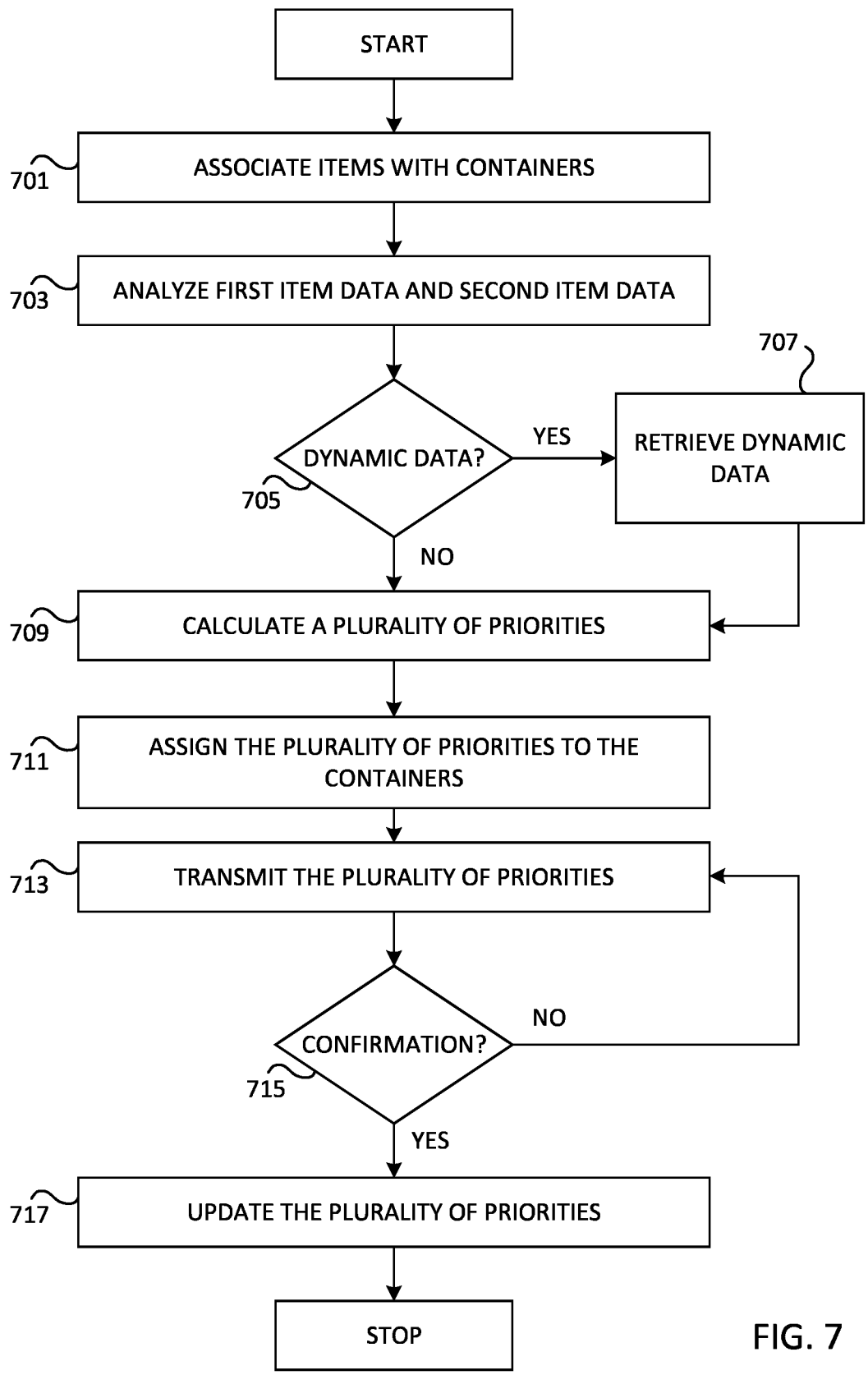
FIG. 7 is an exemplary flow chart illustrating operation of a computing device to determine priorities for stock replenishment.

FIG. 7 is an exemplary flow chart illustrating operation of a computing device to determine priorities for stock replenishment. The method 700 can be implemented by one or more elements of the system 100 and/or the system 200, such as the computing device 102 and RFID module 185. The method 700 is provided for illustration only. Other examples of the method 700 can be used without departing from the scope of the present disclosure.

The process begins by associating a first plurality of items with a first set of containers at 701. For example, the computing device 102 associates a first plurality of items, such as the inventory 211-216, with a first set of containers, such as the containers 161-166 of the storage containers 160 stored in the storage location 150. The computing devices stores the association in one or more of the memory 104 or the data storage device 114 for retrieval by the processor 108. In some examples, the computing device 102 associates the first plurality of items with a location on the item display area 129, such as a particular rack, shelf, section, display area, end display, and so forth at a particular location, such as a geographical location, on the item display area 129. Based on the stored location of particular items, the computing device 102 associates the first plurality of items with the second plurality of items at the specific stored location on the item display area 129. Because the association of the second plurality of items is made not only with the second plurality of items but also with a specific location on the item display area 129, a sales associate can be informed of a particular container of the storage containers 160 in the storage location 150 and the location on the item display area 129 where the container should be transported to in order to replenish the second plurality of items for sale on the item display area 129 when replenishment is needed. In some examples, the first plurality of items is associated with the second plurality of items, which are associated with a stored location on the item display area 129. In these examples, the computing device 102 can determine the location on the item display area 129 for the first plurality of items based on the association with the second plurality of items.

The computing device 102 analyzes the first item data associated with the first plurality of items associated with the first set of containers, and second item data for the second plurality of items associated with a second containers, or second set of containers at 703. The first item data includes data describing at least one attribute of at least one item in the first plurality of items. In some examples, the at least one attribute includes details that can be used to describe the at least one item, such as item type, color, size, model, and so forth. In some examples, the at least one attribute includes sale data regarding the at least one item, such as a quantity of the item in the container, whether the item is on sale, whether the item is part of a promotion, typical sales volume of the item, the price of the item, and so forth. In some examples, the at least one attribute includes data regarding which of the first plurality of items the item is associated with and the location of the item of the first plurality of items on the item display area 129. The second item data includes data describing at least one attribute of at least one item in the second plurality of items.

In examples where attributes of the first item data and/or the second item data include a quantity of the respective item in the respective container, the first item data and the second item data can be obtained by scanning the RFID tag of a container with an RFID module 185, which is then received by the computing device 102. The first item data and the second item data can be received either before, during, or after operation 701 is performed. In some examples, the analysis of the first item data and the second item data includes determining quantities of the items at each particular location. For example, the first item data indicates a quantity of items in the storage location 150 and available to be used to replenish the first items for sale on the item display area 129 meets or exceeds a threshold for items required. In another example, the first item data indicates a quantity of items in the storage location 150 and available to be used to replenish the second items for sale on the item display area 129 does not meet or exceed a threshold for items required. In another example, the second item data indicates a specific quantity of items in stock and available for sale on the item display area 129. In another example, the second item data indicates a quantity of items in stock and available for sale on the item display area 129 meets or exceeds a threshold for items required. In another example, the second item data indicates a quantity of items in stock and available for sale on the item display area 129 does not meet or exceed a threshold for items required. Similarly, the first item data can indicate a specific quantity of items available in the storage location 150 and available to be used to replenish the second items for sale on the item display area 129.

The analysis of the first item data and the second item data can have varying levels of detail. In some examples, such as where the first item data and second item data refer to apparel, the first item data is broken down into categories such as shirts, pants, coats, shoes, undergarments, and socks. In some examples, the first item data is broken down at a greater level of specificity, such as particular models of apparel and broken down by size, color, material, etc. In some examples, the first item data is broken down at an even greater level of specificity, such as by SKU. However, these examples should not be construed as limiting. The first item data and second item data can refer to items for sale in any department of a retail store, including but not limited to items for sale in the apparel, bed, bath, office, automotive, sports, electronics, and pharmacy departments of the retail store.

The computing device 102 determines whether dynamic data is available at 705. As described herein, dynamic data can be stored in the memory 104, in the data storage device 114, in the cloud server 122, or in another location accessible to the computing device 102 via the network 128 and retrieved, obtained, accessed, received, or acquire the dynamic data from its storage location. As described herein, the dynamic data can include, but is not limited to, one or more of data regarding a particular sale that is ongoing at the time, daily data indicating a time of day, weekly data indicating a day of a week, calendar data indicating a time of year, news data indicating current events, weather data indicating weather surrounding the system, or sales data of inventory for sale. In the example described in reference to FIG. 4 above, the retrieved dynamic data indicates the day of the week is Friday, the time of day is afternoon, the month is April, news data include a local sports event, and the weather data indicates rain over the next twenty-four hours. If dynamic data is not available at 705, the computing device 102 proceeds to operation 709. If dynamic data is available, the computing device 102 retrieves the dynamic data from its stored location at 707 before proceeding to operation 709.

The computing device 102 calculates priorities for the first set of containers based on the analyzed first item data, the analyzed second item data, and a set of prioritization rules at 709. For example, the computing device 102 calculates a plurality of priorities for the containers 161-166 stored in the storage location 150. In some examples, the plurality of priorities prioritize the containers 161-166 for transport to particular locations on the item display area 129 to replenish, or restock, the items for sale on the item display area 129. In some examples, calculating the plurality of priorities for the first set of containers includes calculating priorities for the items for sale on the item display area 129, such as the inventory 201-206, via the item priority calculator 106, and then assigning priorities to the first set of containers in the storage location 150 that store additional items of the inventory 201-206 corresponding to the item priority. In other words, the item priority is a priority indicating which of the second items on the item display area 129 is most in need of replenishment, and the container priority indicates the containers in the storage location 150 that store those items.

The set of prioritization rules are guidelines used by the computing device to calculate the plurality of priorities based on the first item data, second item data, and dynamic data in examples where dynamic data is available for retrieval. For example, the set of prioritization rules can include that a threshold indicating a minimum quantity of the second plurality of items should be maintained. In various examples, the set of prioritization rules can prioritize item outages over items which are depleted but have not reached the point of an outage, prioritize promotional items over non-sale items, prioritize items with the greatest sales volume, and so forth. In some examples, the predefined set of rules includes rules weighting the dynamic data retrieved in operation 707. For example, the dynamic data can be weighted such that particular data for items for sale provides customers with the greatest number of choices of items for sale, maximizes profitability of the items for sale, prevents outages of items for sales, and so forth. In some examples, the predefined set of rules is stored as part of the computer-executable instructions 105 stored in the memory 104 and executed by the processor 108. In some examples, the predefined set of rules is an algorithm executed by the processor 108. In one example, executing the set of prioritization rules includes comparing an identified quantity of the second item in the second container, i.e., an item for sale on the item display area 129, with a threshold indicating a minimum quantity of the second item. The threshold In the example described above, the retrieved dynamic data indicates the day of the week is Friday, the time of day is afternoon, the month is April, news data include a local sports event, and the weather data indicates rain over the next twenty-four hours. Based on the retrieved dynamic data, the processor 108 can determine rain jackets with logos of the teams playing in the local sports event should be prioritized for the next 24 hours leading up to the event. The received first item data indicates the rain jackets with logos of the teams playing in the local sports event are part of the inventory 201 in container A 131 and are low in stock. Because the rain jackets are predicted to be in high demand and the current supply on the item display area 129 is low, the rain jackets with logos of the teams playing in the local sports event are calculated to have the highest priority for replenishment. In some examples, analysis of first item data corresponding to rain jackets with logos stored in the storage location 150 that can be used to replenish the items available for sale on the item display area 129 is also taken into account when calculating the item priority. For example, if there are no rain jackets with logos stored in the storage location 150, the items for sale on the item display area 129 are unable to be replenished at the time and they are not calculated as the highest priority. On the other hand, if the first item data indicates a sufficient supply, such as meeting or exceeding a threshold, of rain jackets with logos stored in the storage location 150, the items for sale on the item display area 129 are deemed able to be replenished at the time and eligible to be calculated as the highest priority.

The computing device 102 assigns the calculated plurality of priorities to the first set of containers at 711. The assigned priorities include a first priority of a first container of the first set of containers and a second priority of a second container of the first set of containers. For example, FIG. 2 illustrates six containers 161-166 stored in the storage location 150. A first container, such as the container G 161, is assigned the first, or highest, priority, a second container, such as the container H 162 is assigned the second, or second highest, priority, and so forth. The first priority indicates that based on the set of prioritization rules, the items stored in the container having the highest priority are to be used first to replenish the items for sale at the particular location on the item display area 129 corresponding to the container.

The computing device 102 outputs the assigned container priority at 713. In some examples, the assigned container priority is output on a user interface 110 of the computing device 102. In some examples, the assigned container priority is output by being transmitted, by the communications component 112, to a user device 124 such as the user interface device 190. A user 126 of the user device 124, such as a sales associate, can then remove the items contained in the container of the storage containers 160 having the highest assigned priority, transport the items to the corresponding location on the item display area 129, and replenish the stock of the items having the highest calculated priority. In some examples, such as where the container is a rolling rack that stores items, the sales associate does not remove the items from the container immediately and transports the container of the storage containers 160 to the corresponding location on the item display area 129 for replenishment.

In some examples, the first priority listing 401 is an example of an output of the assigned plurality of priorities. For example, the first priority listing 401 illustrates container G as the highest assigned priority output on a user interface 194 of the user interface device 190. The sales associate can view the user interface 194, identify the container G as the highest assigned priority, and transport either container G, including its inventory 211, or the inventory 211 without transporting the container G itself to the corresponding location on the item display area 129 for replenishment of the in-stock items.

In some examples, transmitting the plurality of priorities to the user device 124 includes transmitting an indication of priority to the user device 124. As described herein, the user device 124 can be an AR device that is configured to display, to a user 126 of the user device 124, an indicator that corresponds to the container of the first set of containers that has the highest priority. As described in the description of FIG. 5, the indicator 503 can be a visual indicator, such as an arrow, a circle, a letter, a number, or any other suitable visual indicator, and/or an audio indicator that alerts the sales associate to the correct container.

The computing device 102 identifies whether a confirmation has been received that the items on the item display area 129 corresponding to the container of the first set of containers having the highest calculated item priority have been replenished at 715. For example, the confirmation can be received from the user device 124 in examples where the assigned priority is transmitted to the user device 124. In examples where the assigned priority is output to the user interface 110 of the computing device 102, the confirmation can be received by receiving an input on the user interface 110 acknowledging the output. In some examples, such as where the assigned priority is related to an outage of a particular item on the item display area 129, receiving the confirmation that the items have been replenished indicates the outage has been resolved. In some examples, the confirmation can be received to confirm that the output has been received at the user device 124.

In some examples, a predefined period of time is allotted for the computing device 102 to receive the confirmation and if the predefined period of time expires prior to receiving the confirmation, the computing device 102 can repeat operation 713 and output the assigned priority again. The predefined period of time that is allotted can depend on the method of output or the type of confirmation required. In examples where a confirmation acknowledging the output is to be received, a predefined period of time can be relatively short, such as thirty seconds, one minute, or two minutes. In examples where a confirmation that the item having the highest calculated priority has been replenished is to be received, the predefined period of time can be relatively longer, such as five minutes, ten minutes, or fifteen minutes, due to the time required for a sales associate to perform the task of accessing the container having the highest assigned container priority, performing the transportation to the particular location on the item display area 129, replenishing the item having the highest calculated priority, and transmitting the confirmation to the computing device 102.

The computing device 102 updates the calculated plurality of priorities and, accordingly, the assigned plurality of priorities at 717. For example, as described herein in the description of the second priority listing 411, following the inventory of the highest calculated item priority being replenished, the second to highest calculated item priority is moved up to the highest item priority, the third to highest calculated item priority is moved up to the second highest item priority, and so forth. Accordingly, the assigned priority is updated so that the container storing the item having the new highest item priority is moved up to the highest assigned container priority. Operation 717 can be repeatedly executed until all containers of the item display area containers 130 are replenished on the item display area 129.

In some examples, operation 717 is executed in response to the confirmation being received in operation 715. In some examples, operation 717 is executed based on updated dynamic data being retrieved. For example, as described herein in the description of the third priority listing 421, updated dynamic data can adjust the priorities of different items for replenishment. As shown in the third priority listing 421, the priority of an item, and accordingly the container of the storage containers 160 it is stored in, can be increased in operation 717.

In some examples, following each container being replenished, the method 700 terminates. During operating hours, a retail location is frequently at varying stages of restocking and replenishing items available for sale on the item display area 129. Accordingly, in some examples, the method 700 continually executes and begins again at operation 701.

By way of example and not limitation, computer readable media comprise computer storage media and communication media can be implemented in one or more examples, such as by the processor 108. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Alternatively, or in addition to the other examples described herein, examples include any combination of the following:
- associating a first plurality of items with a first set of containers;
- analyzing first item data associated with the first plurality of items associated with the first set of containers and second item data for a second plurality of items associated with a second container, wherein the first item data comprises data describing at least one attribute of at least one item in the first plurality of items, and wherein the second item data comprises data describing at least one attribute of at least one item in the second plurality of items;
- calculating a plurality of priorities for the first set of containers based on the analyzed first item data, the analyzed second item data, and a set of prioritization rules, the plurality of priorities indicating an order in which to transport each container of the first set of containers from a first location to a second location;
- assigning the plurality of priorities to the first set of containers, the plurality of priorities comprising a first priority of a first container of the first set of containers and a second priority of a second container of the first set of containers;
- transmitting, via a network, the plurality of priorities to a user interface device, wherein each container of the first set of containers is transported from the first location to the second location in accordance with the plurality of priorities;
- retrieving dynamic data corresponding to an environment including the first location and the second location;
- calculating the plurality of priorities of each container of the first set of containers based at least on the retrieved dynamic data;
- the dynamic data includes at least one of promotional sales data, daily data indicating a time of day, weekly data indicating a day of a week, calendar data indicating a time of year, news data indicating current events, or weather data indicating weather surrounding the first location and the second location;
- the first location is a location in a storage location and the second location is a location associated with at least a portion of an item display area;
- the first item data is retrieved from a first radio frequency identification (RFID) tag corresponding to the first container of the first set of containers;
- the second item data is retrieved from a second RFID tag corresponding to the second container;
- the second item data indicates an outage of the second item;
- updating, based on the outage of the second item, the calculated plurality of priorities to prioritize replenishing the second item;
- updating, based on the updated calculated plurality of priorities, the assigned plurality of priorities to the first set of containers;
- receiving a confirmation the outage of the second item has been resolved by transporting the first items from the first location to the second location and replenishing the second item;
- re-updating, based on the received confirmation, the calculated plurality of priorities, wherein the re-updating includes assigning the replenished second item a lowest priority;
- re-updating, based on the re-updated calculated plurality of priorities, the assigned plurality of priorities to the first set of containers;
- comparing an identified quantity of the second item in the second container with a threshold indicating a minimum quantity of the second item; and
- transmitting an indication of priority to the user interface device, wherein the user interface device is an augmented reality (AR) device configured to display, to a user of the AR device via the indication of priority, an indicator corresponding to the container of the first set of containers having a highest priority.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A computer-implemented method comprising:
    displaying, via a user interface of a radio frequency identification (RFID) scanning device, a map of display containers on a sales floor of a retail facility that need to be scanned for inventory tracking and restocking, the RFID scanning device being a component of an RFID driven inventory restocking system,
    scanning, by the RFID scanning device, RFID tags on the display containers to obtain item display area data indicating quantities of apparel items stocked in the display containers, wherein restocking the apparel items in the display containers includes transporting storage containers from a storage location of the retail facility to the sales floor and transferring the apparel items from the storage containers to the display containers;
    determining, by the user interface of the RFID scanning device, that a scan of an individual one of the display containers is complete based on a percentage of data collected by the RFID scanning device at the individual display container exceeding a threshold;
    responsive to determining that the scan of the individual display container is complete, displaying or emitting, by the user interface of the RFID scanning device, a visual or audio cue to indicate that the scan of the individual display container is complete and updating the map of the display containers to reflect that the individual display container has been scanned for inventory tracking and restocking;

scanning, via the RFID scanning device, RFID tags on the storage containers and ArUco markers on the storage containers to obtain storage location data, each of the RFID tags on the storage containers identifying which specific apparel items are carried by a corresponding one of the storage containers, each of the ArUco markers on the storage containers identifying one or more of the display containers associated with the specific apparel items carried by the corresponding storage container, wherein each of the ArUco markers is a synthetic marker that includes a matrix that is scanned to determine an identifier of the corresponding ArUco marker;

assigning, by the RFID driven inventory restocking system, priorities to the storage containers based on the item display area data and the storage location data, the priorities assigned to the storage containers identifying an order in which to transport the storage containers from the storage location to the sales floor for purposes of restocking the display containers;

displaying, via the user interface of the RFID scanning device, a list of the storage containers in order of restocking priority based on the priorities assigned to the storage containers, wherein a highest priority storage container is positioned at the beginning of the list of storage containers;

receiving, via the user interface of the RFID scanning device, a user input confirming that inventory items carried by the highest priority storage container have been replenished on the sales floor; and updating, via the user interface of the RFID scanning device, the list of the storage containers in response to the user input, wherein a next-highest priority storage container is positioned at the beginning of the updated list of the storage containers.

2. The method of claim 1, wherein the user interface of the RFID scanning device includes a touch screen display configured to receive the user input.

3. The method of claim 1, wherein the user interface of the RFID scanning device includes a natural user interface configured to receive the user input.

4. The method of claim 1, wherein the user interface of the RFID scanning device uses different color icons to differentiate display container(s) that need to be scanned for inventory tracking and restocking from display container(s) that have been scanned for inventory tracking and restocking.

5. The method of claim 1, further comprising:
displaying, via the user interface of the RFID scanning device, a location of a display container on the sales floor that is associated with the inventory items carried by the highest priority storage container.

6. The method of claim 1, further comprising:
receiving, by the RFID driven inventory restocking system, dynamic data associated with the retail facility;
identifying, by the RFID driven inventory restocking system, a local event or forecast condition indicated by the dynamic data, wherein assigning the priorities to the storage containers includes increasing a priority level of a storage container carrying apparel items having a utility specific to the local event or forecast condition indicated by the dynamic data.

7. The method of claim 6, wherein the dynamic data further identifies a sales promotion associated with the apparel items having the utility specific to the local event or forecast condition indicated by the dynamic data, and wherein assigning the priorities to the storage containers further includes further increasing the priority level of the storage container carrying the apparel items, having the utility specific to the local event or forecast condition indicated by the dynamic data, based on the sales promotion.

8. A system adapted for radio frequency identification (RFID) driven inventory restocking, the system comprising:
a radio frequency identification (RFID) scanning device that includes a user interface;
one or more processors; and
memory communicatively coupled to the one or more processors, the memory storing computer-executable instructions that, when executed by the one or more processors, cause the system to perform the following operations:
displaying, via the user interface of the RFID scanning device, a map of display containers on a sales floor of a retail facility that need to be scanned for inventory tracking and restocking;
scanning, by the RFID scanning device, RFID tags on the display containers to obtain item display area data indicating quantities of apparel items stocked in the display containers, wherein restocking the apparel items in the display containers includes transporting storage containers from a storage location of the retail facility to the sales floor and transferring the apparel items from the storage containers to the display containers;
determining, by the user interface of the RFID scanning device, that a scan of an individual one of the display containers is complete based on a percentage of data collected by the RFID scanning device at the individual display container exceeding a threshold;
responsive to determining that the scan of the individual display container is complete, displaying or emitting, by the user interface of the RFID scanning device, a visual or audio cue to indicate that the scan of the individual display container is complete and updating the map of the display containers to reflect that the individual display container has been scanned for inventory tracking and restocking;
scanning, via the RFID scanning device, RFID tags on the storage containers and ArUco markers on the storage containers to obtain storage location data, each of the RFID tags on the storage containers identifying which specific apparel items are carried by a corresponding one of the storage containers, each of the ArUco markers on the storage containers identifying one or more of the display containers associated with the specific apparel items carried by the corresponding storage container, wherein each of the ArUco markers is a synthetic marker that includes a matrix that is scanned to determine an identifier of the corresponding ArUco marker;
assigning priorities to the storage containers based on the item display area data and the storage location data, the priorities assigned to the storage containers identifying an order in which to transport the storage containers from the storage location to the sales floor for purposes of restocking the display containers;
displaying, via the user interface of the RFID scanning device, a list of the storage containers in order of restocking priority based on the priorities assigned to the storage containers, wherein a highest priority storage container is positioned at the beginning of the list of storage containers;
receiving, via the user interface of the RFID scanning device, a user input confirming that inventory items carried by the highest priority storage container have been replenished on the sales floor; and updating, via the user interface of the RFID scanning device, the list of the storage containers in response to the user input, wherein a next-highest priority storage container is positioned at the beginning of the updated list of the storage containers.

9. The system of claim 8, wherein the user interface of the RFID scanning device includes a touch screen display or natural user interface configured to receive the user input.

10. The system of claim 8, wherein the user interface of the RFID scanning device uses different color icons to differentiate display container(s) that need to be scanned for inventory tracking and restocking from display container(s) that have been scanned for inventory tracking and restocking.

11. The system of claim 8, wherein the operations further comprise:

displaying, via the user interface of the RFID scanning device, a location of a display container on the sales floor that is associated with the inventory items carried by the highest priority storage container.

12. The system of claim 8, wherein the operations further comprise:

receiving dynamic data associated with the retail facility; and identifying a local event or forecast condition indicated by the dynamic data, wherein assigning the priorities to the storage containers includes increasing a priority level of a storage container carrying apparel items having a utility specific to the local event or forecast condition indicated by the dynamic data.

13. The system of claim 12, wherein the dynamic data further identifies a sales promotion associated with the apparel items having the utility specific to the local event or forecast condition indicated by the dynamic data, and wherein assigning the priorities to the storage containers based on the dynamic data further includes further increasing the priority level of the storage container carrying the apparel items, having the utility specific to the local event or forecast condition indicated by the dynamic data, based on the sales promotion.

14. A computer program product storing computer-executable instructions that, when executed by one or more processors of a radio frequency identification (RFID) driven inventory restocking system, cause the RFID driven inventory restocking system to perform the following operations:

displaying, via a user interface of an RFID scanning device, a map of display containers on a sales floor of a retail facility that need to be scanned for inventory tracking and restocking, the RFID scanning device being a component of an RFID driven inventory restocking system;

scanning, by the RFID scanning device, RFID tags on the display containers to obtain item display area data indicating quantities of apparel items stocked in the display containers, wherein restocking the apparel items in the display containers includes transporting storage containers from a storage location of the retail facility to the sales floor and transferring the apparel items from the storage containers to the display containers;

determining, by the user interface of the RFID scanning device, that a scan of an individual one of the display containers is complete based on a percentage of data collected by the RFID scanning device at the individual display container exceeding a threshold;

responsive to determining that the scan of the individual display container is complete, displaying or emitting, by the user interface of the RFID scanning device, a visual or audio cue to indicate that the scan of the individual display container is complete and updating the map of the display containers to reflect that the individual display container has been scanned for inventory tracking and restocking;

scanning, via the RFID scanning device, RFID tags on the storage containers and ArUco markers on the storage containers to obtain storage location data, each of the RFID tags on the storage containers identifying which specific apparel items are carried by a corresponding one of the storage containers, each of the ArUco markers on the storage containers identifying one or more of the display containers associated with the specific apparel items carried by the corresponding storage container, wherein each of the ArUco markers is a synthetic marker that includes a matrix that is scanned to determine an identifier of the corresponding ArUco marker;

assigning priorities to the storage containers based on the item display area data and the storage location data, the priorities assigned to the storage containers identifying an order in which to transport the storage containers from the storage location to the sales floor for purposes of restocking the display containers;

displaying, via the user interface of the RFID scanning device, a list of the storage containers in order of restocking priority based on the priorities assigned to the storage containers, wherein a highest priority storage container is positioned at the beginning of the list of storage containers;

receiving, via the user interface of the RFID scanning device, a user input confirming that inventory items carried by the highest priority storage container have been replenished on the sales floor; and updating, via the user interface of the RFID scanning device, the list of the storage containers in response to the user input, wherein a next-highest priority storage container is positioned at the beginning of the updated list of the storage containers.

15. The computer program product of claim 14, wherein the user interface of the RFID scanning device includes a touch screen display configured to receive the user input.

16. The computer program product of claim 14, wherein the user interface of the RFID scanning device includes a natural user interface configured to receive the user input.

17. The computer program product of claim 14, wherein the user interface of the RFID scanning device uses different color icons to differentiate display container(s) that need to be scanned for inventory tracking and restocking from display container(s) that have been scanned for inventory tracking and restocking.

18. The computer program product of claim 14, wherein the operations further include:

displaying, via the user interface of the RFID scanning device, a location of a display container on the sales floor that is associated with the inventory items carried by the highest priority storage container.

19. The computer program product of claim 14, wherein the operations further include:

receiving dynamic data associated with the retail facility; and identifying a local event or forecast condition indicated by the dynamic data, wherein assigning the priorities to the storage containers includes increasing a priority level of a storage container carrying apparel items having a utility specific to the local event or forecast condition indicated by the dynamic data.

20. The computer program product of claim 19, wherein the dynamic data further identifies a sales promotion associated with the apparel items having the utility specific to the local event or forecast condition indicated by the dynamic data, and wherein assigning the priorities to the storage containers based on the dynamic data further includes further increasing the priority level of the storage container carrying the apparel items, having the utility specific to the local event or forecast condition indicated by the dynamic data, based on the sales promotion.

* * * * *